United States Patent [19]
Luthi et al.

[11] Patent Number: 5,470,471
[45] Date of Patent: Nov. 28, 1995

[54] ANTI-REWET DECK FOR PRESS ROLLS

[75] Inventors: Oscar Luthi, Nashua; Antoine G. Abdulmassih, Hudson, both of N.H.; Frank J. Merchel, III, Salem, Mass.

[73] Assignee: Ingersoll-Rand Company, Woodcliff Lake, N.J.

[21] Appl. No.: 62,092

[22] Filed: May 14, 1993

[51] Int. Cl.⁶ .............................. B01D 33/00; D21F 3/08
[52] U.S. Cl. ..................... 210/386; 100/121; 100/131; 162/335; 162/357; 162/368; 162/372; 162/373; 210/402; 210/404; 210/406
[58] Field of Search .................................. 210/386, 404, 210/406, 402; 162/373, 368, 369, 372, 361, 357, 335; 100/121, 131

[56] References Cited

U.S. PATENT DOCUMENTS

| | | | |
|---|---|---|---|
| 3,150,083 | 9/1964 | Luthi | 210/404 |
| 3,225,935 | 12/1965 | Porteous | 210/404 |
| 3,238,866 | 3/1966 | Strindlund | 100/121 |
| 3,342,124 | 9/1967 | Frykhult | 100/121 |
| 3,837,499 | 9/1974 | Luthi | 210/404 |
| 3,840,429 | 10/1974 | Busker et al. | 162/205 |
| 3,969,802 | 7/1976 | Bouvet | 100/121 |
| 4,154,687 | 5/1979 | La Valley | 210/404 |
| 4,276,169 | 6/1981 | Browne et al. | 210/406 |
| 4,353,296 | 10/1982 | Beucker | 100/121 |
| 4,366,025 | 12/1982 | Gordon, Jr. et al. | 100/121 |
| 4,370,231 | 1/1983 | La Valley | 210/404 |
| 4,447,941 | 5/1984 | Schnell et al. | 100/121 |
| 4,906,364 | 3/1990 | Luthi et al. | 210/404 |
| 5,063,840 | 11/1991 | Vote | 100/121 |
| 5,244,572 | 9/1993 | McAllister | 210/402 |
| 5,273,512 | 12/1993 | Ducasse | 100/121 |

*Primary Examiner*—Virginia Manoharan
*Attorney, Agent, or Firm*—Robert F. Palermo; Michael H. Minns

[57] ABSTRACT

An anti rewet deck is provided for press rolls used to increase consistency of fibrous pulp slurry from approximately 4 percent up to about 30 to 50 percent. This is accomplished by biasing the location of the drainage holes in the roll shell to the forward edge of the drainage compartments within the roll shell. To avoid the necessity for handing of the rolls, a mechanism is provided for accomplishing the purposes of minimizing rewet at practical production rates by providing baffle plates which effectively orient the draining pattern in the desired direction. Such baffles can be permanently or removably installed once the desired handing of the rolls is determined.

8 Claims, 5 Drawing Sheets

ID_5,470,471

ANTI-REWET DECK FOR PRESS ROLLS

BACKGROUND OF THE INVENTION

This invention relates generally to press rolls and more particularly to twin roll presses having rolls with features for minimizing rewet of a fibrous pulp cake after it has passed through a roll nip in which liquid is expressed from the fibrous pulp.

Twin roll presses are used to thicken pulp slurries from approximately 4 percent consistency to between 30 and 50 percent consistency (measured as percent dry fiber in a given weight of slurry). Such presses are well-known in the art and are applied, for example, to dewatering of papermaking pulp and to washing such pulp followed by such dewatering.

Two rolls having perforated decks are installed side by side in a pressurized vat into which a pulp slurry is fed from both longitudinal sides of the vat. The rolls are counterrotating so that their outer edges travel downward into the slurry and their inner edges travel upwardly to define a nip between the rolls. A pulp mat which forms on the surface of the rolls, due to flow of liquid through the porous roll decks, is squeezed at high pressure in the nip to express a substantial portion of the remaining liquid from the pulp. After passing upward through the roll nip, the relatively dry pulp cake is scraped from the rolls by doctor blades and is conveyed out of the vat at a substantially higher consistency than the feed consistency.

Generally, the rolls consist of an axial core upon which are arrayed a number of longitudinal support ribs which support, at their outer edges, a heavy walled hollow roll shell. The roll shell has a number of circumferential grooves within which are drainage holes providing liquid communication between the grooves and a number of internal drainage compartments defined by the outer surface of the core, the support ribs, and the inner surface of the shell. Drainage slots are provided in each support rib adjacent the inner surface of the roll shell to permit extracted liquid to flow to the lowest drainage compartment within the roll deck. Actual flow of the liquid from the roll deck drainage compartments is out the ends of the roll.

Ideally, the filtrate extracted through the perforated roll surface is drained at a rate sufficient to assure that the drainage compartments are liquid free when such compartments emerge above the nip. However, at practical production rates, this is rarely accomplished. As a result, some of the liquid remaining in the drainage compartments drains back through the roll surface and is absorbed by the expanding pulp mat. This results in the pulp being discharged at a consistency several points below the peak consistency achieved in the roll nip.

As capacity demands increase, longer rolls, higher roll speed and increased filtrate flow will be required. In addition, higher consistency is always desired and demands increased nip load. If the thicknesses of the roll shell, the support ribs and the core are increased to provide the added support required for the increased nip loads, significantly smaller flow passages will result for the same roll diameter. The increased production will require a greater volume of filtrate to flow through these smaller passages. It is to be expected, therefore, that the degree of rewetting will increase. In the case of a wash press, such rewetting with dirty liquid seriously lowers the washing efficiency.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished in a press having two rolls, each with a perforated deck and drainage compartments below said deck, said rolls rotatably coacting to form a nip therebetween in which a fibrous slurry is squeezed to express liquid therefrom, by the improvement in combination with said press, comprising means for minimizing reflux of liquid, from drainage compartments which have rotated to positions above the nip, back into fibrous material retained upon the surface of said rolls after said liquid has been expressed from said fibrous material within said nip.

The foregoing and other aspects will become apparent from the following detailed description of the invention when considered in conjunction with the accompanying drawing figures.

DETAILED DESCRIPTION

Figure 1:
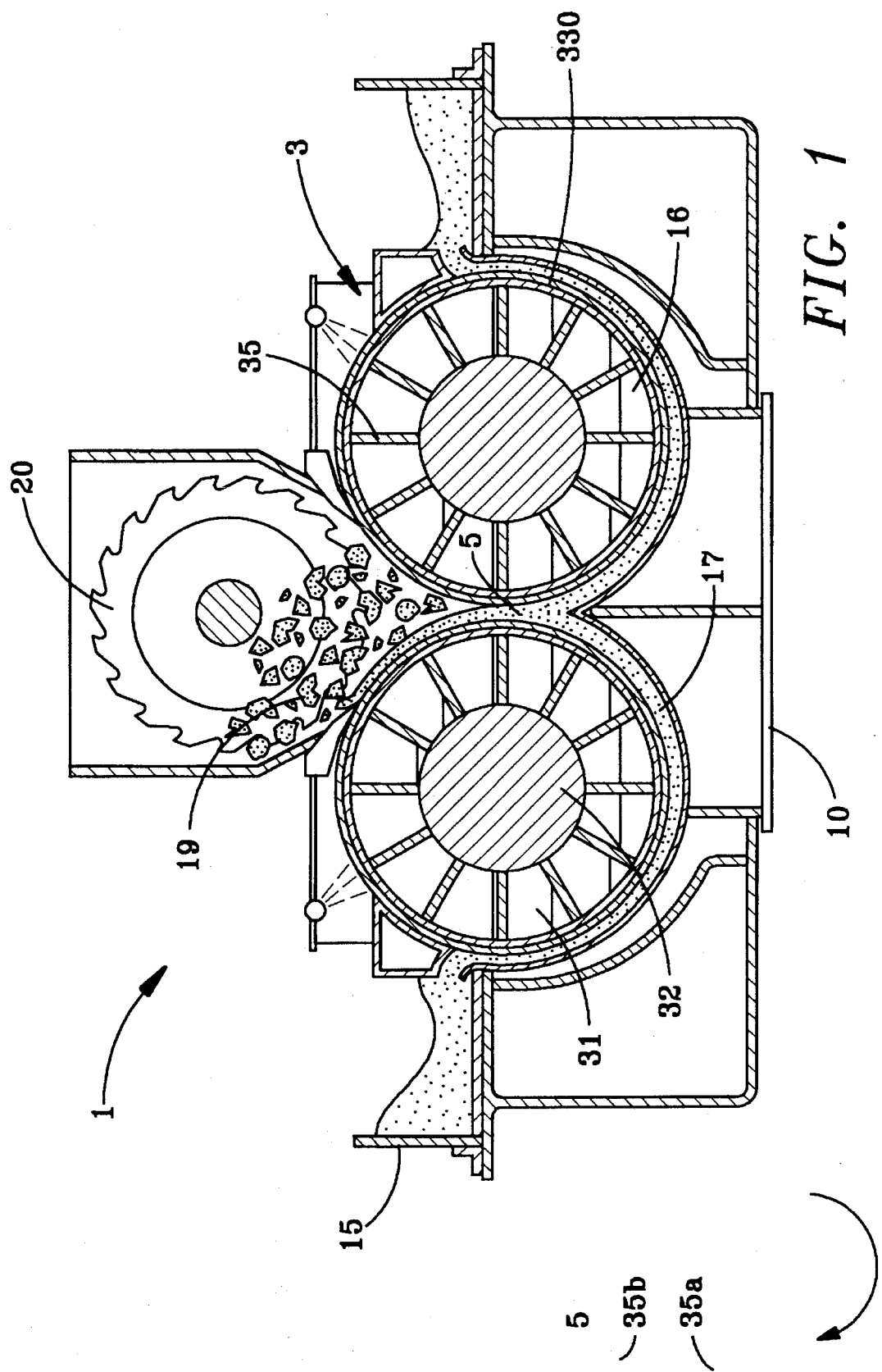
FIG. 1 is a transverse fragmentary schematic cross section of a typical twin roll press illustrating the general arrangement of the components.

The present invention can best be understood by considering FIGS. 1, 2, 2a, and 3 together, since they illustrate common structural features and shortcomings of press rolls of the present art.

A typical twin roll press 1 has a pressurized vat 10 fed by two longitudinal inlet boxes 15, one along each longitudinal side of the vat, two press rolls 3 and a pulp discharge device 20. At the point of closest approach between the two rolls 3, a nip 5 is defined, through which passes a pulp mat 17 formed on the surface of perforated filter plates 50 on the outermost surface of each press roll 3.

As the pulp slurry enters from inlet box 15, it travels downward along the inner surface of vat 10 with the outer surface of roll deck 330 of each press roll 3. Roll deck 330 consists of perforated filter plates 50 which are supported on the surface of roll shell 30 and whose perforations are in liquid communication with circumferential grooves 33 and communicate, through drainage holes 40 in roll shell 30, with drainage compartments 31. Drainage compartments 31 are defined by support rib 35, roll core 32, and roll shell 30. Crossover ports 45, located in support ribs 35 adjacent the interior surface of roll shell 30, provide liquid communication between drainage compartments 31 to allow downflow of extracted liquid to the lowest portion of the interior of press roll 3. The roll deck 330, shown in the FIGURES rotates in a clockwise direction. Each drainage compartment 31 is bounded by two support ribs 35, one rib being a leading support rib 35a, the other rib being a trailing support rib 35b.

Since vat 10 is pressurized, and since drainage compartments 31 are maintained at atmospheric pressure, the liquid portion of the pulp slurry, or filtrate 16, is driven through the perforated filter plates 50 into drainage compartments 31. This results in formation of a pulp mat 17, on the surface of roll deck 330, which is carried forward on the rotating deck to nip 5, defined by the line of closest approach between the parallel rolls 3. In travelling through the nip 5, pulp mat 17 is exposed to extreme mechanical pressure which expresses a substantial majority of liquid filtrate 16 from pulp mat 17 to result in a high consistency pulp cake 19 which is scraped from the surface of press roll 3 by doctor knife 60 and is removed from the twin roll press vat 10 by discharge device 20.

Figure 2:
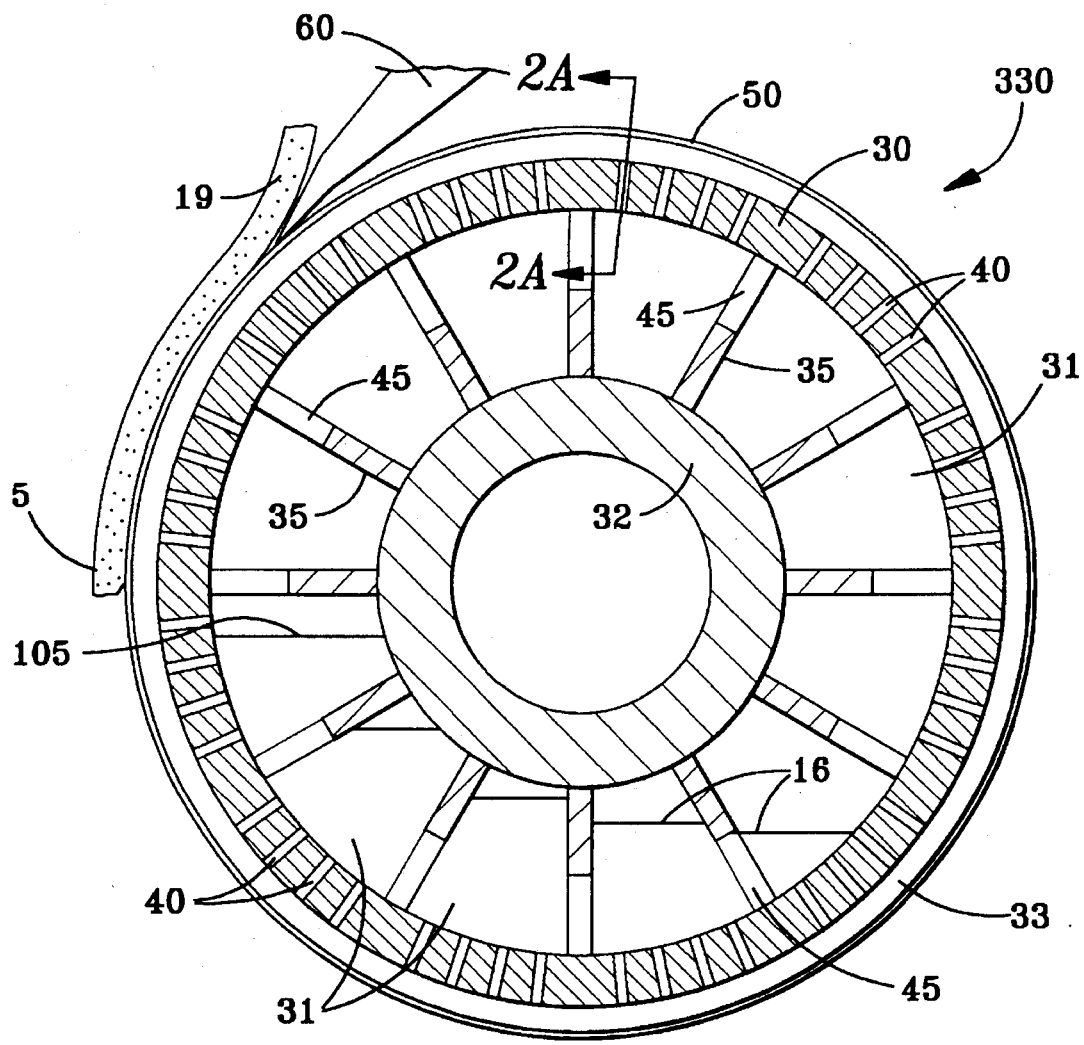
FIG. 2 is a transverse cross sectional view showing further detail of the construction of one roll of a twin roll press and further illustrating the ideal distribution of liquid within the roll.
Figure 2A:
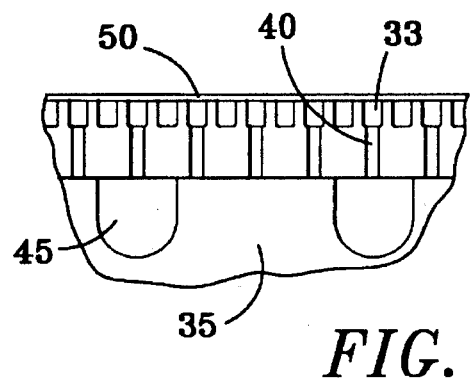
FIG. 2a is a longitudinal section of the area designated A—A in FIG. 2.

The operation of a twin roll press, as just described, is what one could expect if the ideal filtrate distribution within drainage compartments 31, as shown in FIG. 2, prevails. This distribution of filtrate 16, however, is obtained only in the case of sufficiently slow operation of the press to permit rapid enough flow of filtrate from the ends of press rolls 3 to maintain the filtrate level 105 in the circumferential grooves at or below that shown in FIG. 2. This mode of operation avoids rewet of the pulp cake 19 above the nip 5. However, when operated at practical production speeds, the distribution of filtrate 16, within drainage compartments 31, is more accurately described by FIG. 3. Here it is seen that filtrate 16 within drainage compartments 31 persists at a sufficient level to cause rewet through filter holes 40 and drainage plates 50 into pulp cake 19 well above nip 5.

Figure 3:
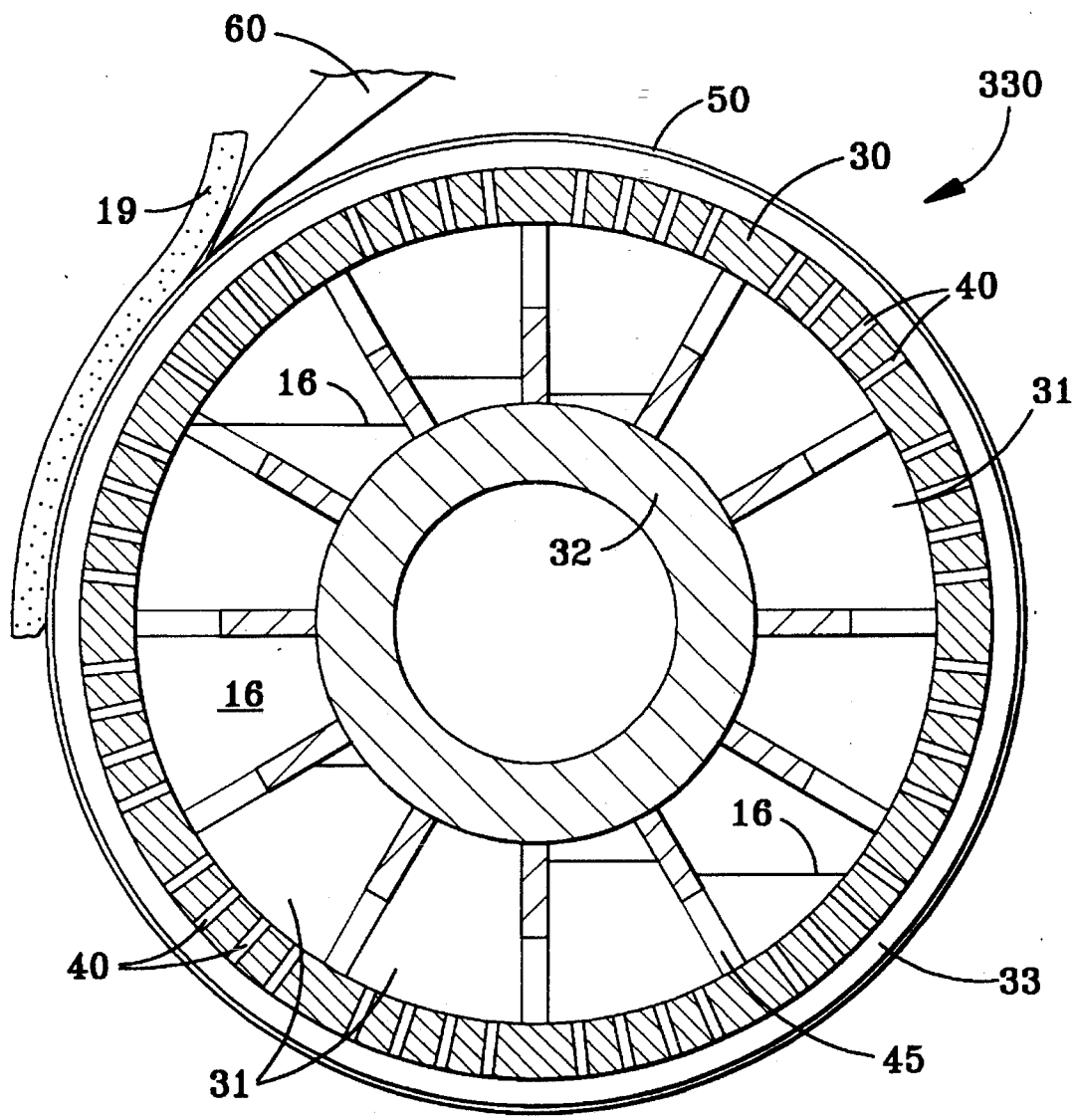
FIG. 3 is a fragmentary view as in FIG. 2 illustrating an approximate distribution of liquid within the drainage compartments of the typical press roll.
Figure 4:
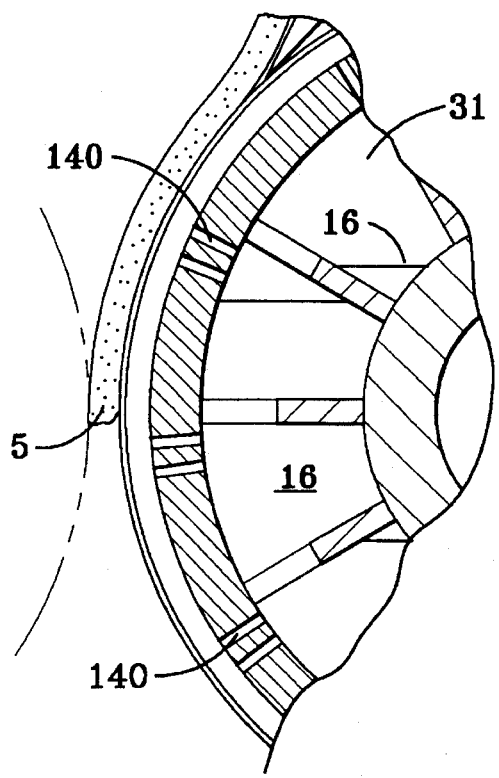
FIG. 4 is a fragmentary view of a press roll illustrating one embodiment of the anti rewet feature of the present invention.
Figure 4A:
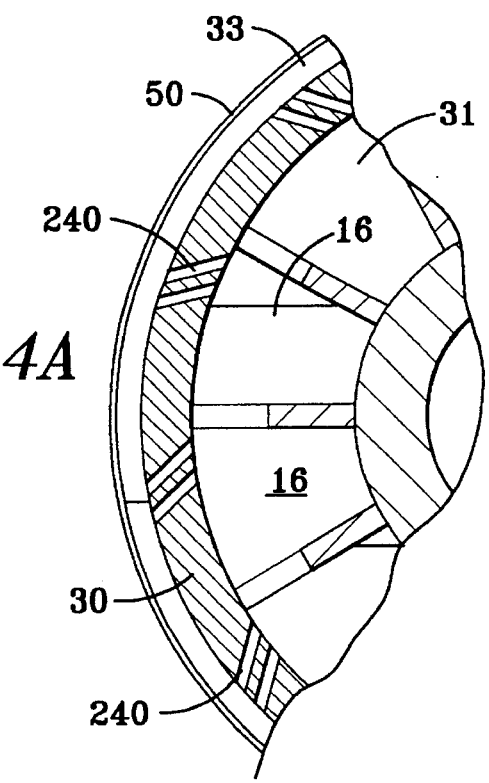
FIG. 4a is a fragmentary view of a roll as in FIG. 4 illustrating another embodiment of the anti-rewet feature of the present invention.

Two embodiments of the present invention are illustrated in FIGS. 4 and 4a, in which all unnumbered features of the press rolls are the same as in FIGS. 1–3. By locating drainage holes 140 at the leading edge of drainage compartment 31, a barrier to reflux of filtrate 16 is effectively provided. This is clearly illustrated in FIG. 4, in which it is seen that liquid reflux, from drainage compartments 31 into circumferential grooves 33 and from there through perforated filter plates 50, ceases prior to the roll rotating drainage holes 140 into the 9 o'clock position on the roll. This is below the tightest portion of nip 5 and is, therefore, of no consequence to the consistency of pulp cake 19. By drilling holes 240 on an angle inclined with respect to the direction of rotation, as illustrated in FIG. 4a, it can be seen that the liquid level within circumferential groove 33 may be biased to a slightly lower level than provided by drainage holes 140 in FIG. 4. Although holes 240 are shown inclined forward in the direction of movement, they may also be drilled to incline away from that direction.

In both cases illustrated in FIGS. 4 and 4a, the rolls are handed; that is, they must be matched and installed within the press vat in only a single orientation, otherwise the anti rewet feature is defeated.

FIGS. 5a–5d illustrate four examples of a baffle plate embodiment of the anti rewet feature of the present invention. Baffle plate 175 is shown extending upwardly from the leading face of support rib 35 to a point close to the leading edge of the drainage compartment. This is similar to baffle plate 177 in FIG. 5c with the exception that baffle plate 177 is attached to the inner surface of roll shell 30 rather than the forward surface of support rib 35. This attachment is shown in a nonspecific manner, but it is clear that the attachment can be by welding, bolting, or even by a dovetail groove or the like. In both cases baffle plates 175 and 177 extend only to a point near the leading edge of drainage compartment 31. This produces a result similar to that produced by the preferential location of drainage holes 140 and 240 in the roll shell, as illustrated in FIGS. 4 and 4a. The main difference is that, in this case, conventional roll shells 30 can be used; because the shells do not become handed until the baffle plates are installed. It is clear, also, that when retention of the baffle plates 175 and 177 is accomplished by dovetail grooves or the like, grooves can be provided symmetrically so that installation of baffle plates can be accomplished regardless of direction of rotation of the particular roll shell 30.

Figure 5A:
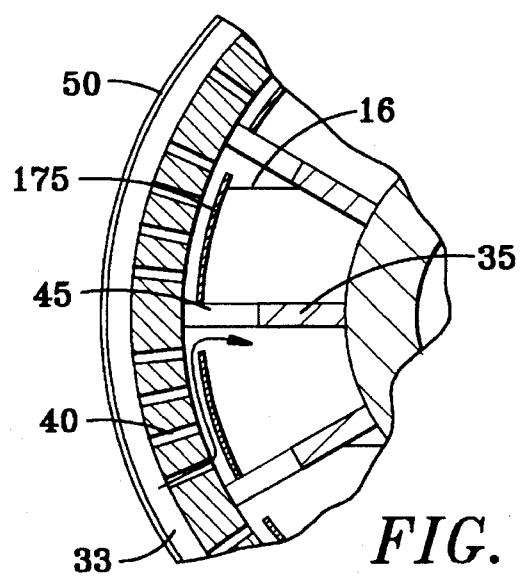
FIGS. 5a–5d present four variations of a baffle plate embodiment of the anti-rewet feature of the present invention.
Figure 5B:
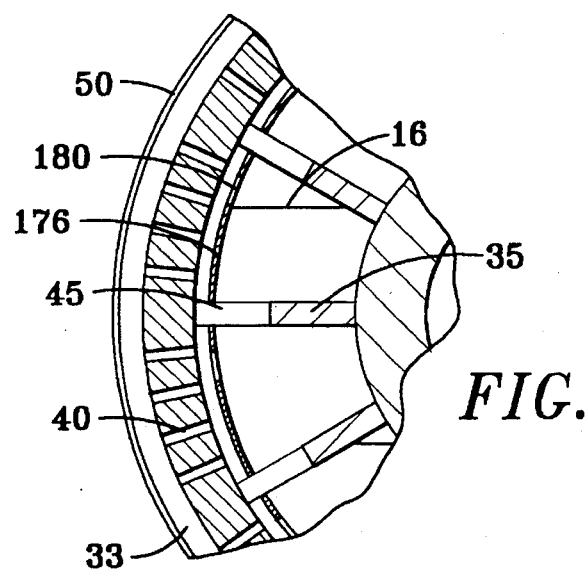
Figure 5C:
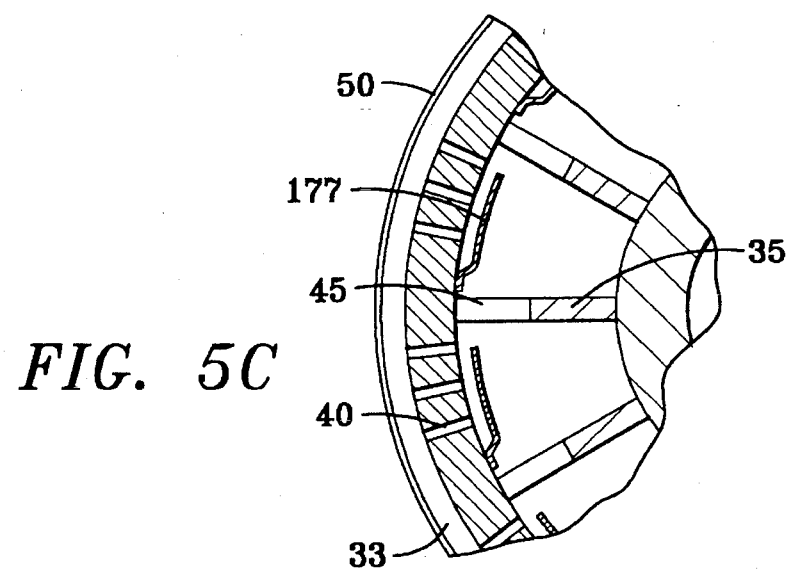
Figure 5D:
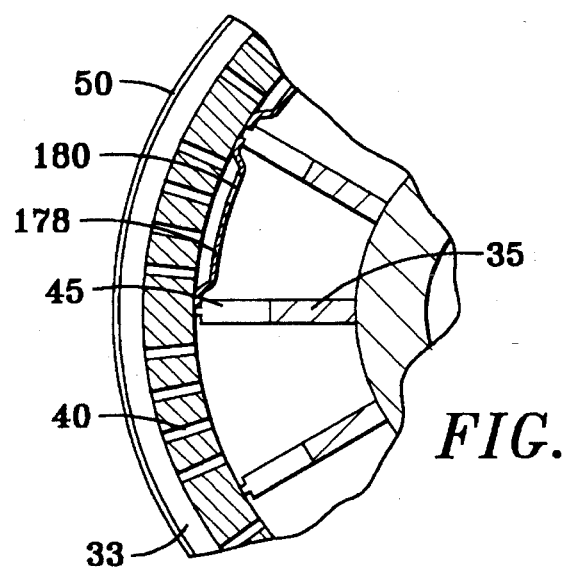

Baffle plates 176 in FIG. 5b and 178 in FIG. 5d extend across the full height of the drainage compartment 31. In both cases, drainage ports 180 are provided near the leading edge of the drainage compartment so that drainback of filtrate 16 from the drainage compartment ceases after drainage ports 180 have rotated above the surface level of filtrate 16. Again, attachment of baffle plates 176 and 178 may be by bolting or welding or other such process; however, the preferred method of attachment must be by means of dovetailed or other such grooves, into which the baffle plates may be longitudinally inserted, after the handing desired for the roll is determined.

It should be clear that the present invention enables the operation of twin roll press washers and pulp thickeners at higher production rates. This higher production is achieved without sacrificing the consistency increase for which twin roll presses are so well known. Moreover, incorporation of the present invention makes possible achievement of increased production rates without necessitating an increase in the size or structural strength of the press roll.

What is claimed is:

1. A deck for a liquid extraction press roll for processing fibrous materials, comprising:

a rotatable hollow cylindrical roll shell having drainage holes located in circumferential grooves in an outer surface of said roll shell;

an axial core for rotatably driving said roll shell, said core having mounted thereon longitudinal support ribs which support the roll shell and which define drainage compartments bounded by said axial core, said support ribs, and said roll shell; said support ribs further having cross-over ports which permit flow of liquid between said drainage compartments, each drainage compartment being bounded by two support ribs, said roll shell and said axial core, said axial core being rotated in a predetermined direction whereby one of said two support ribs is a leading support rib and the other of said two support ribs is a trailing support rib;

perforated filter plates mounted upon said roll shell, said filter plates permitting passage of liquid therethrough into the circumferential grooves, through the drainage holes, and into the drainage compartments while retaining fibrous material upon an outer surface of said filter plates; and means for minimizing reflux of liquid from said drainage compartments, which have rotated to positions above a nip formed between said deck and a deck of a coacting liquid extraction press roll, back into said fibrous material on the outer surface of said filter plates, the means for minimizing reflux of liquid limiting the flow of liquid through the drainage holes into and out of a drainage compartment to an area proximate the leading support rib.

2. The deck of claim 1, wherein the means for minimizing reflux of liquid comprises drainage holes located in the circumferential grooves of the roll shell only proximate the leading support rib of each drainage compartment.

3. The deck of claim 2, wherein drainage holes are drilled at an angle of inclination with respect to the direction of travel of the surface of the roll shell.

4. The deck of claim 1, wherein the means for minimizing reflux of liquid comprises a longitudinal baffle plate in each drainage compartment radially inward from said roll shell.

5. The deck of claim 4, wherein said baffle plate is joined to and extends, in the direction of rotation of said roll shell, from the trailing support rib to a point near the leading support rib of said drainage compartment.

6. The deck of claim 4, wherein said baffle plate is joined to said roll shell near the trailing support rib of said drainage compartment and extends to a point near the leading support rib of said drainage compartment.

7. The deck of claim 4, wherein said baffle plate extends the full distance between the trailing support rib and the leading support rib, said baffle plate having drainage ports for draining liquid from the space between said roll shell and said baffle plate into said drainage compartment, said drainage ports being located near the leading support rib of said drainage compartment.

8. The deck of claim 4, wherein said baffle plate is supported within said drainage compartment in longitudinal grooves at the leading and trailing support ribs of said drainage compartment and is removable through an end of said roll shell by sliding longitudinally therefrom.

* * * * *